United States Patent [19]

Nitzberg et al.

[11] Patent Number: 4,791,961
[45] Date of Patent: Dec. 20, 1988

[54] FLUID JOINT SWIVEL COUPLING

[75] Inventors: Leonard R. Nitzberg, Knoxville, Tenn.; Paul D. Carmack, Tipp City, Ohio

[73] Assignee: Helix Enterprises, Inc., Knoxville, Tenn.

[21] Appl. No.: 173,362

[22] Filed: Mar. 25, 1988

Related U.S. Application Data

[63] Continuation-in-part of Ser. No. 107,947, Oct. 13, 1987.

[51] Int. Cl.[4] ............................................. F16L 37/28
[52] U.S. Cl. .................... 137/614.04; 285/1; 285/69; 285/272
[58] Field of Search .............. 285/1, 2, 68, 69, 272, 285/317; 137/614.04, 68.1

[56] References Cited

U.S. PATENT DOCUMENTS

| | | | |
|---|---|---|---|
| 1,118,707 | 11/1914 | Clasen | 285/1 |
| 3,797,510 | 3/1974 | Torres et al. | 137/614.04 |
| 4,124,228 | 11/1978 | Morrison | 285/1 |
| 4,269,226 | 5/1981 | Allyead | 285/1 |
| 4,691,941 | 9/1987 | Rabushka et al. | 285/1 |

Primary Examiner—A. Michael Chambers
Attorney, Agent, or Firm—Alan Ruderman

[57] ABSTRACT

A fluid swivel joint coupling has a body member, a first connecting member and a second connecting member. The body member includes an inlet portal, and outlet portal and a diverted fluid passageway connecting them. The first connecting member is pivotably mounted in flow communication with one of the portals for rotation about a first swivel axis, and the second connecting member is pivotably connected in flow communication with the other portal for rotation about a second swivel axis. The second connecting member has a diverted fluid passageway opening onto a third portal, a longitudinal axis extending through the third portal and a portion of the passageway. The first connecting member is operatively connected to a rigid conduit while the second connecting member is operatively connected at the third portal to a flexible conduit. The axes are disposed such that the longitudinal axis is never in the plane which passes through the first swivel axis parallel to the second swivel axis, so that the longitudinal axis may align itself with the direction of any flexible force applied through the flexible conduit. The body member and the second connecting member may have interlocking elements which cooperatively couple, and which uncouple when a tensile force above a predetermined limit is interposed between the flexible conduit and the rigid conduit.

22 Claims, 3 Drawing Sheets

FLUID JOINT SWIVEL COUPLING

REFERENCE TO RELATED APPLICATIONS

This application is a continuation-in-part of copending application Ser. No. 07/107,947 filed Oct. 13, 1987.

BACKGROUND OF THE INVENTION

This invention relates to a fluid line swivel joint connector, and more particularly to a swivel joint connector having fluid input and output ends for communicating a first fluid conduit rotatably about a first axis at one end to a second fluid conduit rotatable about a second axis at the other end, one of the conduits being flexible and the other being rigid, the connector behind adapted to align the longitudinal axis of the end attached to the flexible conduit with the direction of any tensile force applied through the flexible conduit. The swivel joint may be mounted in a fuel line of a fuel dispensing station so that the swivel joint may permit a dispensing nozzle to pivot relatively to the fuel line, or it may permit a first section of the line to pivot relatively to another section, and the pivot joint may have detachable means which uncouples to shut flow communication at the joint when the tensile load at the joint is above a predetermined level.

It is known in the fuel dispensing art to include a swivel connector at the dispenser/hose interface so that twisting loads applied to the dispenser are not transmitted to the hose resulting in twisting thereof. Such swivels merely permit the dispenser, such as a fuel dispensing nozzle, to be pivoted about one or more axes relative to the axis of the hose, the swivel permitting flow communication means between the hose and the dispensing device.

Additionally, it is known to utilize quick disconnect or breakaway couplings in the fuel line spaced from the dispenser so that if a vehicle is driven away from the fuel dispensing station before the dispensing nozzle is removed from the filler neck of the vehicle, an uncoupling will result, shutting the flow of fuel and preventing the volatile fuel to be spilled due to either a dislodging of the moorings of the fuel dispensing station, breakage of the hose, or other failure of the fuel dispensing system. The prior art has proposed a number of decouplers which are acuated by a tensile force in the line. In our aforesaid copending application Ser. No. 07/107,947, the problems and deficiencies of the prior art decoupler units was described and combination swivel joint and quick disconnect coupling devices are disclosed and claimed, the devices having coupling means between first and second body members which swivel relatively to one another and the coupling means acting normally to connect the body members in flow communication and for decoupling when an external tensile force above a predetermined level is applied to the fuel line, and valving acting for shutting flow communication when the body members are decoupled.

There are, however, certain occasions wherein the direction of the external tensile force applied to the fuel line is such that both in conventional swivel connectors and in the combination swivel joint quick disconnect couplings or connectors disclosed in the aforesaid patent application where the tensile force will not permit the swivel joint to pivot, i.e., the reaction force to the external tensile force does not act in a direction which effects rotation about the pivot axis. Such conditions may occur when a swivel joint having one end connected to a flexible fluid conduit, such as a hose, and another end connected to a rigid fluid conduit, such as a nozzle, does not permit the end connected to the flexible conduit to align itself with the direction in which the tensile force is applied. When this occurs a bending moment results which may act to shear the interconnecting members of the joint. For example, if the external tensile force is applied in the same plane as that of the pivot axis of the swivel joint and of the axes of the inlet and outlet to the swivel joint, the reaction to that force can only be resisted by the interconnecting members of the joint, and if the force is substantial a shearing of the elements may occur.

SUMMARY OF THE INVENTION

Consequently, it is a primary object of the present invention to provide a two axis fluid swivel joint coupling having means at one end connected to a flexible conduit and means at another end connected to a rigid conduit, and wherein the coupling can align the longitudinal axis of the end connected to the flexible conduit with the direction of any tensile force applied through the flexible conduit.

It is another object of the present invention to provide a two axis fluid swivel joint coupling having fluid input and output ends, one end being connected to a first conduit rotatable about a first axis and the other end being connected to a second conduit rotatable about a second axis, one of the conduits being flexible and operatively connected to the swivel joint, and wherein the longitudinal axis of the connection between the flexible conduit and the swivel joint connector is offset relative to a plane parallel to the one of the swivel axes and passing through the other axis.

It is a further object of the present invention to provide a two axis fluid swivel joint coupling having a body including input and output portals, the portals being connected to respective connecting members, the connecting members being adapted to pivot about respective offset swivel axes passing through the body, a first of the connecting members having a fluid passageway extending along a longitudinal axis offset relative to the swivel axis extending through the portal to which it is connected and communicates with a flexible conduit, the other connecting member being connected to a rigid conduit, the swivel axes and the longitudinal axis of the passageway through the first connecting member being disposed such that the longitudinal axis of the passageway at the connection between the flexible conduit and the first connecting member never lies in the plane through the swivel axis extending through the second connecting member which is parallel to the other swivel axis extending through the portal to which the first connecting member is connected.

Accordingly, the present invention provides a two axis fluid swivel joint coupling having a body member including an inlet portal, an outlet portal and a diverted fluid passage therebetween. A first connecting member is pivotably connected to and in flow communication with a first of the portals for rotation about a first swivel axis passing through the first portal and the body member. A second connecting member is pivotably connected to and in flow communication with the second of the portals for rotation about a second swivel axis passing through the second portal and the body member. The first connecting member is operatively connected to a rigid conduit. The second connecting member has a diverted fluid passageway including a longitudinal axis extending through a third portal. The second connecting member is operatively connected to a flexible conduit with the third portal in flow communication therewith so that fluid may flow through the swivel joint between the rigid conduit and the flexible conduit. The longitudinal axis of the second connecting member is disposed relative to the first and second swivel axes such that the longitudinal axis is always offset from that plane which passes through the first swivel axis and is parallel to the second swivel axis. i.e. it is never in that plane.

The intended environment for the swivel joint coupling of the present invention is in the fuel dispensing line at a fuel dispensing station. Thus, the rigid conduit may be a fuel dispensing nozzle which would be connected to the first connecting member at the outlet of the body member and the flexible conduit then would be the fuel supply hose connected to the second connecting member at the inlet of the body member, or alternatively, the rigid conduit may be rigid piping connected to the fuel system and anchored to structural framework at the station, the piping being connected to the first connecting member at the inlet of the body member and the second connecting member would then be connected between a hose and the outlet of the body member. In either instance the swivel joint is connected in the fuel line between the nozzle and a supply conduit which receives metered fuel from a remote location.

The body member may be connected to the second connecting member by a conventional pivotable coupling permitting fuel communication therethrough, or the connection may be a combination swivel joint quick disconnect coupling similar to that disclosed in our aforesaid copending patent application wherein the coupling between the body member and the second connecting member may be disengaged and the communication of the fuel therethrough may be shut when an external tensile force above a predetermined limit is applied to the fuel line.

In the preferred embodiment of the invention the first swivel axis through the first connecting member is offset from both the second swivel axis and the longitudinal axis of the second connecting member, and the second swivel axis is also offset from the longitudinal axis of the second connecting member. More specifically, the three axes never lie in the same plane. However, although the second axis may lie in a plane with one of the other axes, the longitudinal axis of the second connecting member may not be in that plane through the first swivel axis which is parallel to the second swivel axis.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENTS

Figure 1:
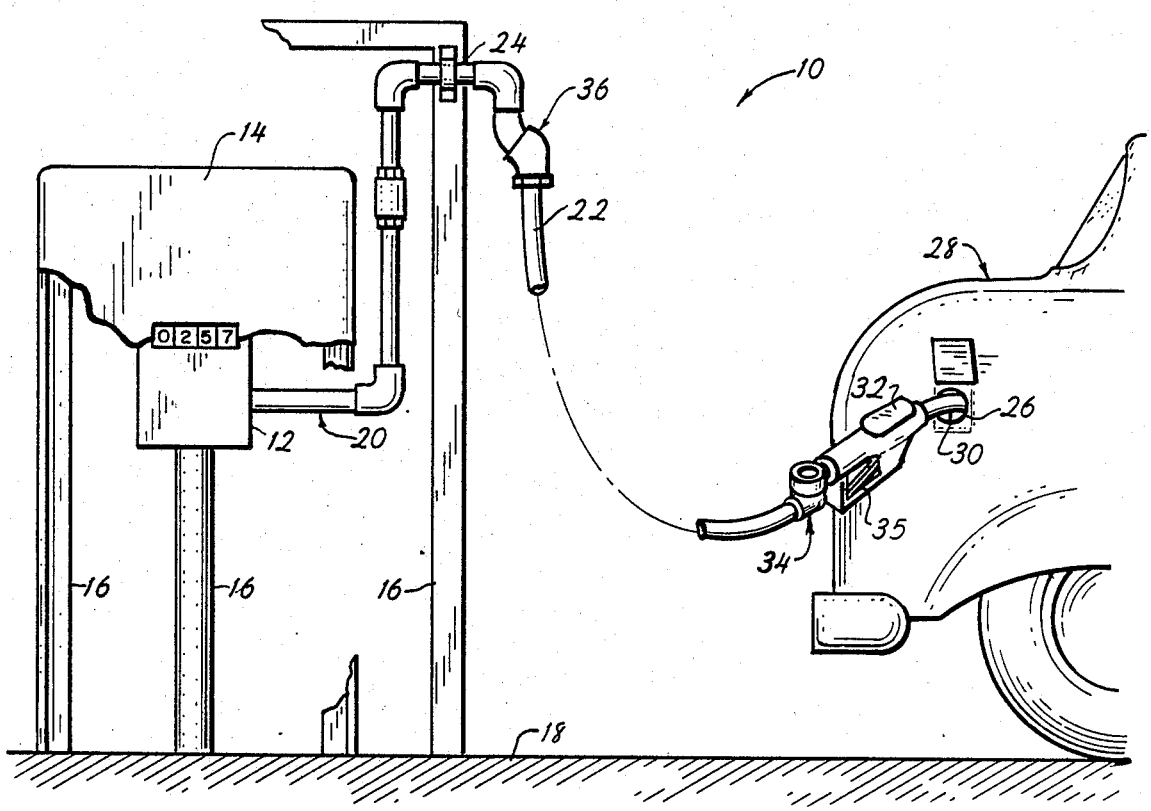
FIG. 1 is an elevational view of a portion of an automobile at a fuel dispensing station illustrating fuel being dispensed into the automobile from pumping apparatus having a fuel delivery line incorporating a swivel joint connector constructed in accordance with the principles of the present invention.

Referring now to the drawings, a swivel joint coupling according to the present invention may be utilized in connection with fuel dispensing facilities of various types especially those dispensing stations which dispense gasoline and diesel fuel to the public. Although other applications may readily be envisioned, for disclosure purposes the present invention will be described in conjunction with fuel dispensing stations located at service stations. Thus, as illustrated in FIG. 1, a dispensing station generally indicated at 10 includes measuring apparatus 12 adapted to receive and measure pressurized fluid fuel, such as gasoline and fuel oil, pumped from a remotely located storage tank through underground piping(not illustrated), the pumping equipment being adapted to be manually actuated by an operator using the facility. The measuring equipment is generally mounted within a cabinet 14 or the like secured to structural framework such as members 16 anchored by conventional means to an island on which the dispensing station is supported or to the ground 18.

Metered fuel exits the measuring equipment after being pumped thereto and from there conventionally flows through piping generally indicated at 20 comprising various conventional piping couplings, nipples, fittings and other conventional connecting members which convey the fuel from the measuring equipment to a flexible hose 22. Adjacent the connection with the hose, and intermediate that location and the measuring equipment, the piping 20 is anchored by conventional anchoring means 4 to a structural support, which may be part of the structural framework 16. The anchoring means 24 secures the piping and resists the external loads which may be placed on the various components to thereby resist damage to those components and the measuring apparatus 12. The flexible hose 22 is of a conventional re-enforced construction as approved by the appropriate regulatory bodies, and may be of any convenient size and length to permit an operator to easily reach the fuel tank inlet 26 of a vehicle 28 for insertion therein of the spout 30 at the end of a rigid dispensing nozzle 32, the nozzle being connected in flow communication with the hose 22 either directly or by means of a swivel joint connector, which preferably may be a swivel joint connector or coupling 44 constructed in accordance with the principles of the present invention. Alternatively, the swivel joint connector 34 my be placed between the hose and the rigid piping, such as at 36. However, for purposes of describing the invention, the coupling 34 is disclosed as between the nozzle 32 and the hose 22, the hose being a flexible conduit. Conventionally the nozzle includes valving in the fluid passageway in the body thereof, the valving being controlled by an adjustment trigger 35 biased to close the valving and operable to open the flow passageway upon depression or squeezing by the operator.

Under normal conditions, a vehicle operator will drive his or her vehicle 28 adjacent the fuel dispensing station 10, and then either an attendant or the operator will remove the nozzle 32 from a storage location on the cabinet 14, turn on the pumping equipment, insert the nozzle spout 30 into the inlet to the vehicle fuel tank, and squeeze the trigger 35 to dispense the fuel. When the dispensing operation is completed, the individual is expected to remove the nozzle spout from the fuel tank inlet, turn off the pumping equipment and replace the nozzle on the cabinet. After paying for the fuel received, the vehicle operator will drive the vehicle from the premises. Occasionally, a vehicle may be driven from the proximity of the dispensing station 10 without first removing the nozzle spout 30 from the fuel tank inlet 26. This may occur for a number of reasons, and is not necessarily limited to individual operators pumping their own gas, but could occur as a result of a driver of a large truck not being able to see the station attendant and believing the fueling process to be completed. When this occurs forces are generated at the nozzle which may dislodge and damage the measuring equipment 12, the forces generated at the nozzle being tensile forces which are transmitted through the hose 22 to the piping and resisted by the anchoring means 24. However, when such forces exceed that for which the anchoring means is capable of withstanding, damage to the measuring equipment 12 as well as the various components of the piping may result. Additionally, when such damage occurs the highly combustible fuel may be spilled resulting in a potential fire hazard and additional environmental hazards.

Described in our aforesaid patent application is a combination swivel joint and quick disconnect device which may be interposed between the hose 22 and the nozzle 32 thereby serving as a detachable and flexible nozzle swivel, or alternatively it may be interposed between various sections of the hose or between the piping and the hose to thereby serve as a detachable and flexible hose swivel. However, as with conventional swivel couplings, the detachable swivel device disclosed in our aforesaid patent application may not function as a swivel when the direction of application of the tensile force prevents pivoting of the components about the pivot axes. This can occur when the swivel joint connector will not permit the end connected to the hose to align itself with the direction in which the tensile force is applied. When this occurs a bending moment results and if the tensile force is sufficient a shearing of the interconnecting swivel members of the joint can result.

In the present invention, at least the longitudinal axis of that portion of the swivel joint which is connected to the hose (or other flexible conduit) is always offset from the one plane which passes through the swivel axis of the connecting member attached to the nozzle (or other rigid conduit) parallel to the other swivel axis. This will be understood by referring to FIG. 2 for a general description of a swivel joint coupling 34 which meets this criteria The swivel joint coupling 34 has a first connecting member 38 which may be attachable at its free end to the rigid nozzle 32 depicted in FIG. 1 and is mounted within an annulus of a body member 40 for relative rotation about a pivot or swivel axis 42. As hereinafter described the connecting member 38 has a fluid passageway which communicates with a diverted fluid passageway within the member 40. The body member 40 is additionally connected to a second connecting member 44 for relative rotation about a second pivot or swivel axis 46, the connecting member 44 having a fluid passageway, as hereinafter described, which normally communicates the passageway within the body member 40 to a portal 48 at its free end where it may be attachable to the flexible hose 22 depicted in FIG. 1. The passageway through the second connecting member 44, as hereinafter described, is diverted from the direction of fluid flow between the body member 40 substantially along the axis 46 to a direction extending in a line of flow along the longitudinal axis 50 through the portal 48, this being the direction of fluid flow through the flexible hose at the connection with the second connecting member 4. Thus, the axis 50 is never in the plane through the axis 42 which is parallel to the axis 46. It is either parallel to that plane, will intersect that plane, or is skewed relative to that plane. Although in the illustrated instance that plane is offset from the axis 46, it need not be for the swivel joint coupling to align the axis 50 with the direction of any tensile force applied through the hose 22, as long as the above criteria applies.

Figure 3:
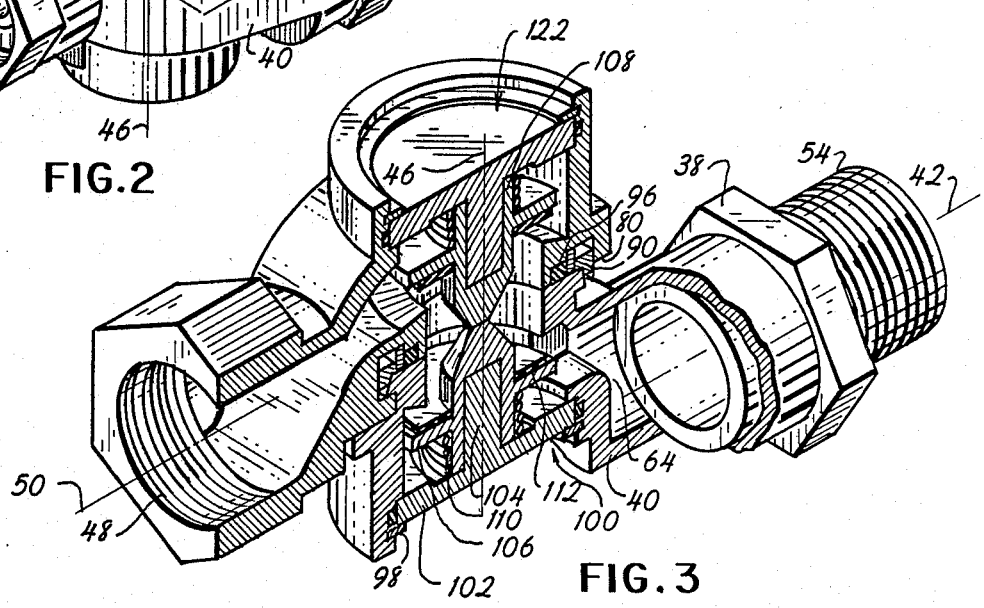
FIG. 3 is a perspective view partly broken away of a swivel joint coupling similar to that illustrated in FIG. 2, and incorporating quick disconnect decoupling means.
Figure 4:
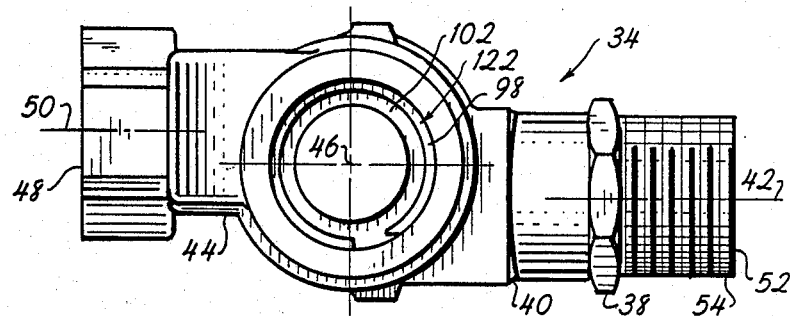
FIG. 4 is a top plan view of the quick disconnect swivel joint coupling of FIG. 3.
Figure 5:
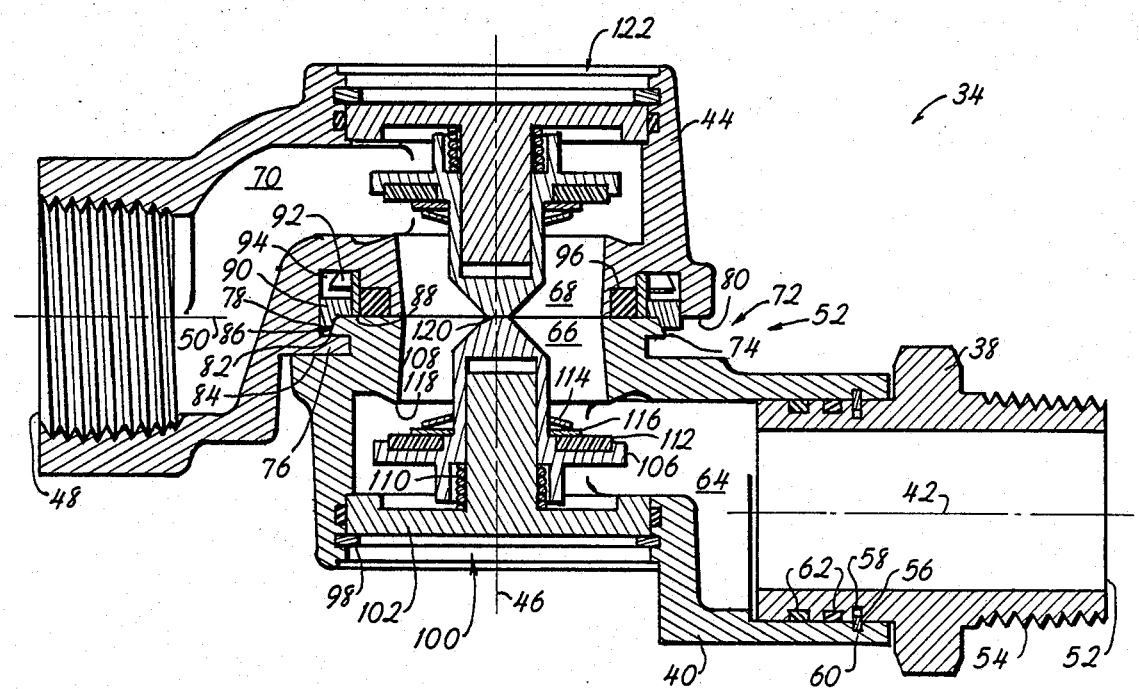
FIG. 5 is a cross sectional view taken substantially along line 5—5 of FIG. 4.

The details of the swivel joint coupling 34 can be clearly understood with reference to FIGS. 3 through 5. Although the coupling 34 may be a direct flow-through swivel coupling for permitting pivotable swiveling about the axes 42 and 46, for purposes of condensation of this description, the swivel joint coupling of the present invention is here disclosed as a detachable quick disconnect or breakaway swivel coupling of the type disclosed in our aforesaid copending patent application. Accordingly, the first connecting member 38 comprises a conduit which preferably is a male member connected within an annulus 52 of the body member 40 and rotatable relative thereto about the axis 42, the annulus 52 defining a portal for ingress or egress of fluid for communication thereof through the conduit or connecting member 38. Threads 54 on the outside surface of the connecting member 38 exterior of the body member 40 are adapted to connect this member to a rigid conduit such as the nozzle 32, in which event the portal defined by the annulus 52 is the exit portal of the swivel coupling. Alternatively the threads 54 may connect the member 38 to rigid piping and the annulus 52 would then be the inlet portal. An annular spring type retaining or detent member 56 positioned within an annular recess 58 formed in the outside wall of the connecting member 38 and received within an annular recess 60 in the inner wall of the annulus 52 permits the member 38 to swivel or rotate relative to the body 40 about the axis 42. A pair of seals in the form of "O" rings 62 preclude leakage of fluid through the portal due to the relative rotation.

A fluid passageway 64 is defined within the interior of the body member 40, and this passageway is diverted in direction from the axis 42 through the annular portal 52 to another portal 66 in the body member 40. In this instance the passageway 64 is thus diverted by 90°. The portal 66 is disposed about the axis 46, and is the inlet portal of the body member 40 when the portal defined by the annulus 52 is the outlet portal, and vice versa. The portal 66 is mounted in flow communication with a portal 68 in the second connecting member 44 by means of a pivotable connection such that the second connecting member 44 may swivel or rotate relative to the body member 40 about the swivel axis 46. The connecting member 44 includes a diverted passageway 70 extending from the portal 68 disposed about the axis 46 to the portal 48 disposed about the axis 50. Again in this instance the angle at which the passageway 70 is diverted is 90°. The portal 68 functions as an outlet and the portal 48 as an inlet of the connecting member 44 when the portal 66 is the inlet to the body member 40. Thus, both the body member 40 and the second connecting member 44 have diverted passageways 64, 70 respectively which change the direction of flow through the swivel joint, the passageway 64 acting to change the flow direction from that coincidental with the swivel axis 42 to that coincidental with the swivel axis 46, while the passageway 70 changes the direction of flow in the member 44 from that coincidental with the longitudinal axis 50 to a direction coincidental with the swivel axis 46.

The body member 40 and the second connecting member 44 may be pivotably connected together in conventional manner similar to the pivotable connection between the first coupling member 38 and the body member 40. However, if it is desired that the swivel joint function to separate when an extraneous tensile force on the fluid line is above a predetermined level, the body member 40 and the connecting member 38 may have interconnectable means generally indicated at 72 such as that disclosed in our aforesaid patent application. The means 72 permits the second connecting member 44 and the body member 40 to rotate relative to each other about the axis 46 when coupled and to forcibly uncouple by sliding apart as a result of the excessive extraneous tensile force applied between the first connecting member 38 and the second connecting member 44 along a line of action with respect to the axes 42 and 50. The interconnectable means 72 comprises interlocking member 74 and 76 on the body member 40 and the second connecting member 44 respectively. These interlocking members are constructed in a mortise and tenon fashion in the sense that member 72 is received within a dado slot 78 formed in step fashion between the member 76 and a surface 80 of the second connecting member 44, the member 74 including a lip 82 spaced from a ledge 84 formed on the body member 40, and the member 76 is received within the space between the lip 82 and the ledge 84. The interlocking member 76 is an arcuate substantially semi-circular segment formed about the axis 46 at the portal 68 of the second connecting member 44. The interlocking member 74 is an annular hub formed about the portal 66 in the body member 40, the center of the annulus being the axis 46. The interlocking members 74 and 76 thus have corresponding surfaces which interface together when the body member 40 and the second connecting member 44 are slidably juxtaposed into coupling engagement, and may rotate relative to one another hen so coupled.

The peripheral wall 86 of the interlocking member 74 has a conically tapered form, the taper being from the lip 82 to the outer surface 88 spaced from the lip remote from the ledge 84. When the members 74 and 76 are joined, the conically tapered portion of the member 74 interfaces with a correspondingly tapered internal portion of an annular detent ring 90, the detent ring 90 being urged into engagement with the member 74 by means of a preloading bias wave spring 92. The detent ring 90 and the spring 92 are received within an annular well or recess 94 formed in the second connecting member 44 and opening onto the dado adjacent the ledge 80. As so held the member 74 is prevented from moving relative to the member 76 in the direction of disengagement, while the conically tapered wall portion 86 of the member 74 may rotate within the cooperating surface of the detent ring 90, the latter also acting as a bearing surface for such rotation. An annular seal such as "quad" ring 96 acts as a fluid seal to prevent leakage as fluid flows through the portals 66, 68. Thus, an infrangible release is provided by the cooperation of the interlocking members and the detent ring, the release acting to uncouple the body member 40 and the second connecting member 44 upon application of a tensile load in excess of a predetermined level in the direction of disengagement.

Valving means is provided in each of the body member 40 and the second connecting member 44, which valving means is disposed to maintain the portals 66, 68 in flow communication with each other when the members 40 and 44 are coupled together, yet close the respective passageways when the body members are uncoupled. Thus, an annular retaining ring 98 is disposed in a cavity 100 in the body member 40 for positioning a cap valve 102 therein. The cap 102 includes a guide spindle 104 extending substantially along the axis 46. A check valve 106 having an intregral hollow stem 108 receives the spindle 104 and is movable along the axis 46 guided by the spindle 104, while a coil spring 110 acts to bias the check valve 106 toward the portal 66. An annular check valve seat is disposed about a rim of the check valve 106 and is retained thereon by means of a pair of retaining members 114, 116. When the body member 40 is disconnected from the second connecting member 44 the valve seat 112 is forced into cooperation with an annular seat 118 to close the portal 66, and when this occurs the free end 120 of the valve stem 108 projects out of the portal 66. An identical valving structure is disposed within a cavity 122 of the second connecting member for closing the portal 68 therein when the second connecting member 44 is uncoupled from the body member 40, and the reference numbers in regard thereto are omitted for purposes of clarity. When the members are coupled together the free ends 120 of each of the valve stems 108 are forcibly engaged to overcome the bias of the respective spring 110 and open the flow path through the portals 66, 68.

Figure 2:
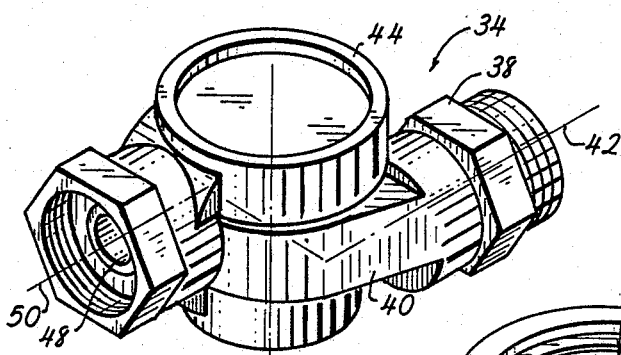
FIG. 2 is a perspective view of one form of swivel joint coupling constructed in accordance with the present invention, the coupling being a 90° swivel joint.

The relationship of the axes 42, 46 and 50 can be clearly seen in FIG. 4 to correspond with that illustrated in FIGS. 2 and 3. Thus, whether the swivel joint is detachable when the tensile force is above a predetermined limit or is merely a conventionally connected swivel joint fluid coupler, the axis 50 is never in the plane through the axis 42 which is parallel to the axis 46, and in this preferred embodiment of the invention that plane is also offset from the axis 46.

The effect of the relationship between the axes 42, 46 and 50 can be clearly understood with reference to FIGS. 6 through 9.

Figure 6:
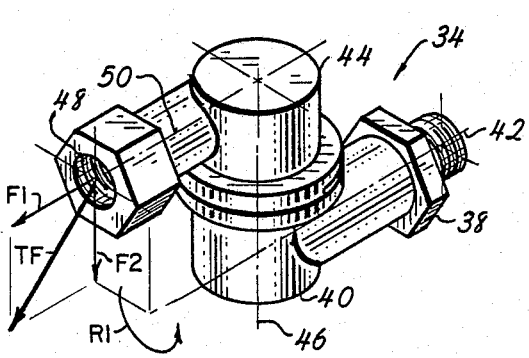
FIGS. 6 through 9 are schematic representations of a swivel joint coupling constructed according to the present invention depicting the results of tensile forces applied to the coupling in various directions.

FIG. 6 illustrates that a tensile force T.F. applied to the flexible conduit attached at the port 48 of the swivel joint 34 at an angle in a vertical plane has two components; an axial component $F_1$ in the direction of the axis 50 and a vertical component $F_2$. The axial component $F_1$ is resisted by the rigid conduit attached to the connecting member 38 while the vertical component $F_2$ effects a counter-clockwise rotation $R_1$ of the swivel joint about the axis 42 as viewed from the left end in the figure. Thus a reaction along the axis 46 tending to pull or pry the connecting member 48 from the body member is precluded.

Figure 7:
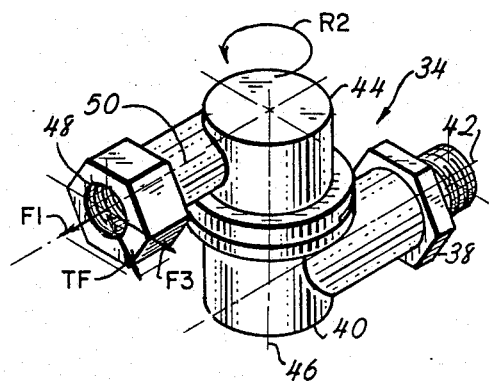

In FIG. 7 a tensile force T.F. applied to the flexible conduit at an angle to a horizontal plane also has two components, $F_1$ and $F_3$, $F_1$ being axially along the axis 50 and resisted by the reaction forces along the axis 42, while $F_3$ is a horizontal component which acts to rotate the connecting member 44 relatively to the body member 40 about the axis 46 in the direction illustrated at $R_2$, i.e., counter-clockwise as viewed from the top of the figure.

Figure 8:
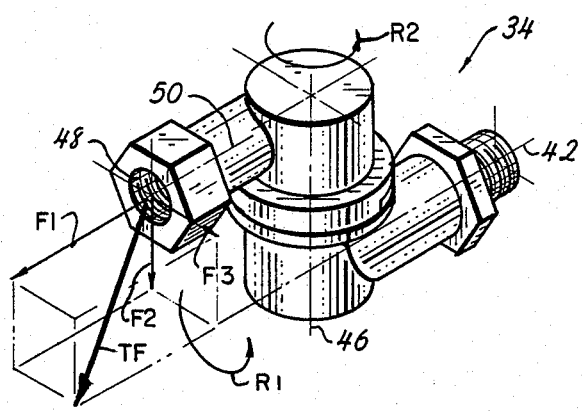

FIG. 8 illustrates the effect of the tensile force T.F. applied to the flexible conduit at an angle to both the vertical and horizontal plane. Here there are three components: $F_1$, $F_2$ and $F_3$. $F_1$ is an axial component along the axis 50, while $F_2$ is a vertical component effecting rotation of the swivel joint about the axis 42 in the direction $R_1$, and $F_3$ is a horizontal component effecting rotation of the connecting member 44 relatively to the body member 40 about the axis 46 in the direction $R_2$.

Figure 9:
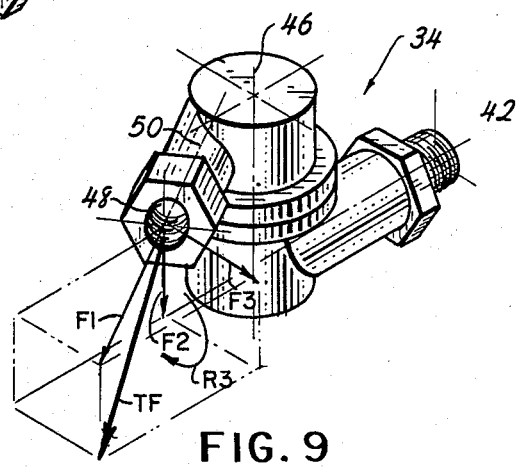

FIG. 9 is similar to FIG. 8 except that the connecting member 44 is illustrated in a rotated initial position relative to the position illustrated in FIG. 8. Here, the axis 50 is skewed relative to the axis 42 and the portal 48 is on the other side of the axis 42 from that illustrated in FIG. 8 (and FIGS. 6 and 7). The components $F_1$, $F_2$ and $F_3$, as illustrated in FIG. 8, are respectively axial, vertical and horizontal forces which are resisted by a clockwise rotation $R_3$ of the swivel joint about the axis 42 as viewed from the left end of the figure.

In each case illustrated in FIGS. 6 through 9, the force applied to a flexible conduit connected at the port 48 is resisted without a reaction force tending to pull or pry apart the swivel connection between the body member 40 and the connecting member and the connecting member 44 because of the geometric relationship between the axes 42, 46 and 50, i.e., axis 50 is never in that plane through axis 42 which is parallel to axis 46.

Figure 10:
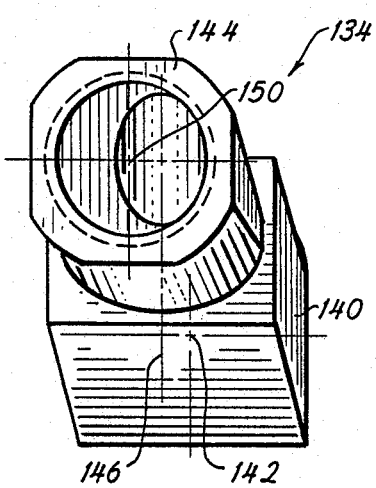
FIG. 10 is an end view of a 45° swivel joint coupling incorporating the features of the present invention.
Figure 11:
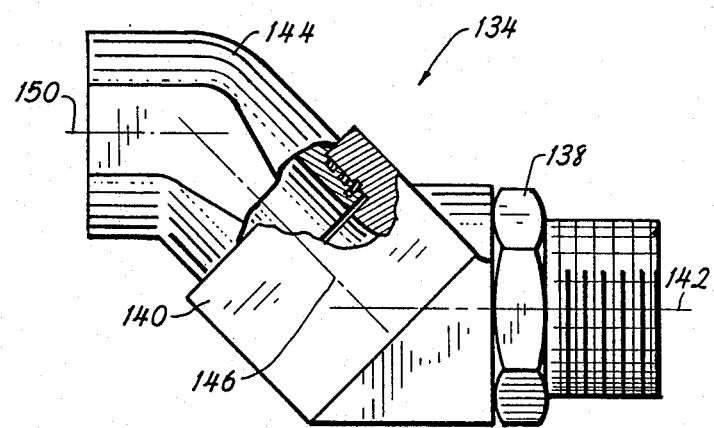
FIG. 11 is a side elevational view partly broken away of the coupling illustrated in FIG. 10.

In FIGS. 10 and 11 another swivel joint coupling 134 is illustrated wherein the body member 140 has a diverted passageway of 45° as distinct from the 90° diverted passageway in the body member 40. The connecting member 138 is rotatable about the axis 142 while the body member 140 together with the connecting member 138 may rotate relative to the connecting member 144. The connecting member 144 has a diverted fluid passageway from the line of flow along the axis 146 to the line of flow along the axis 150, also 45°. Again, in this embodiment the axis 150 is never in the plane through the axis 142 which is parallel to the axis 446, so that the reaction to any tensile force applied will not tend to pry apart and thus snap or break the connection between the connecting member 144 and the body member 140.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A fluid swivel joint coupling having a body member including an inlet portal, an outlet portal and a diverted fluid passageway therebetween, a first connecting member pivotably connected to and in flow communication with a first of the portals for rotation about a first swivel axis passing through the first portal and the body member, a second connecting member pivotably connected to and in flow communication with the second of the portals for rotation about a second swivel axis passing through the second portal and the body member, means for connecting said first connecting member to a rigid conduit, said second connecting member having a diverted fluid passageway including a longitudinal axis extending through a third portal, means for connecting said second connecting member to a flexible conduit with the third portal in flow communication therewith so that fluid may flow through the swivel joint between the rigid conduit and the flexible conduit, the longitudinal axis of the second connecting member being disposed relative to the first and second swivel axes such that said longitudinal axis is never in that plane which passes through the first swivel axis and is parallel to the second swivel axis.

2. A fluid swivel joint coupling as recited in claim 1, wherein said first of the portals defines said outlet portal, said second of the portals defines said inlet portal, said rigid conduit comprising a fuel dispensing nozzle, and said flexible conduit comprising a hose.

3. A fluid swivel joint coupling as recited in claim 1, wherein said first of the portals defines said inlet portal, said second of said portals defines said outlet portal, said rigid conduit comprising piping communicating with fuel metering apparatus, and said flexible conduit comprising a hose.

4. A fluid swivel joint coupling as recited in claim 1, wherein said diverted fluid passageway in said body member comprises a passageway offset relatively to said first axis in a plane normal to said first axis and offset relatively to said first axis in a plane parallel to said first and second axes.

5. A fluid swivel joint coupling as recited in claim 4, wherein said diverted fluid passageway in said second connecting member comprises a passageway offset relatively to said longitudinal axis in a plane normal to said longitudinal axis and offset relatively to said longitudinal axis in a plane parallel to said longitudinal axis and said said second axis.

6. A fluid swivel joint coupling as recited in claim 5, wherein said body member and said second connecting member include cooperating interconnecting coupling means, said coupling means including locking means for locking said body member an said second connecting member together in coupling relationship to permit relative rotation about said second axis and for unlocking said body member and said second connecting member to permit uncoupling thereof when an external tensile force above a predetermined limit is applied between said first connecting member and said second connecting member.

7. A fluid swivel joint coupling as recited in claim 6, including valve means in said body member and said second connecting member for shutting flow communication between said second of said portals and said third portal when said body member and said second connecting member are uncoupled.

8. A fluid swivel joint coupling as recited in claim 1, wherein said diverted fluid passageway in said second connecting member comprises a passageway offset relatively to said longitudinal axis in a plane normal to said longitudinal axis and offset relatively to said longitudinal axis in a plane parallel to said longitudinal axis and said said second axis.

9. A fluid swivel joint coupling as recited in claim 1, wherein said first axis is offset from said second axis.

10. A fluid swivel joint coupling as recited in claim 9, wherein said diverted fluid passageway in said body member comprises a passageway offset relatively to said first axis in a plane normal to said first axis and offset relatively to said first axis in a plane parallel to said first and second axes.

11. A fluid swivel joint coupling as recited in claim 9, wherein said diverted fluid passageway in said second connecting member comprises a passageway offset relatively to said longitudinal axis in a plane normal to said longitudinal axis and offset relatively to said longitudinal axis in a plane parallel to said longitudinal axis and said said second axis.

12. A fluid swivel joint coupling as recited in claim 1, wherein said longitudinal axis is offset from said second axis.

13. A fluid swivel joint coupling as recited in claim 12, wherein said diverted fluid passageway in said body member comprises a passageway offset relatively to said first axis in a plane normal to said first axis and offset relatively to said first axis in a plane parallel to said first and second axes.

14. A fluid swivel joint coupling as recited in claim 12, wherein said diverted fluid passageway in said second connecting member comprises a passageway offset relatively to said longitudinal axis in a plane normal to said longitudinal axis and offset relatively to said longitudinal axis in a plane parallel to said longitudinal axis and said said second axis.

15. A fluid swivel joint coupling as recited in claim 1, wherein said first axis and said longitudinal axis are offset from said second axis and from each other.

16. A fluid swivel joint coupling as recited in claim 15, wherein said diverted fluid passageway in said body member comprises a passageway offset relatively to said first axis in a plane normal to said first axis and offset relatively to said first axis in a plane parallel to said first and second axes.

17. A fluid swivel joint coupling as recited in claim 16, wherein said diverted fluid passageway in said second connecting member comprises a passageway offset relatively to said longitudinal axis in a plane normal to said longitudinal axis and offset relatively to said longitudinal axis in a plane parallel to said longitudinal axis and said said second axis.

18. A fluid swivel joint coupling as recited in claim 17, wherein said body member and said second connecting member include cooperating interconnecting coupling means, said coupling means including locking means for locking said body member and said second connecting member together in coupling relationship to permit relative rotation about said second axis and for unlocking said body member and said second connecting member to permit uncoupling thereof when an external tensile force above a predetermined limit is applied between said first connecting member and said second connecting member.

19. A fluid swivel joint coupling as recited in claim 18, wherein valve means in said body member and said second connecting member for shutting flow communication between said second of said portals and said third portal when said body member and said second connecting member are uncoupled.

20. A fluid swivel joint coupling as recited in claim 17, wherein said first of the portals defines said outlet portal, said second of the portals defines said inlet portal, said rigid conduit comprising a fuel dispensing nozzle, and said flexible conduit comprising a hose.

21. A fluid swivel joint coupling as recited in claim 17, wherein said first of the portals defines said inlet portal, said second of said portals defines said outlet portal, said rigid conduit comprising piping communicating with fuel metering apparatus, and said flexible conduit comprising a hose.

22. A fluid swivel joint coupling as recited in claim 15, wherein said diverted fluid passageway in said second connecting member comprises a passageway offset relatively to said longitudinal axis in a plane normal to said longitudinal axis and offset relatively to said longitudinal axis in a plane parallel to said longitudinal axis and said said second axis.

* * * * *